United States Patent Office

3,847,825
Patented Nov. 12, 1974

3,847,825
PARTIALLY CARBONIZED ORGANIC POLYMERS AS MATRICES FOR SELF-LUBRICATING FILMS AND COMPOSITES
Melvin T. Lavik and Ronald D. Hubbell, Kansas City, Mo., assignors to Midwest Research Institute, Kansas City, Mo.
No Drawing. Filed Nov. 8, 1972, Ser. No. 304,720
Int. Cl. C10m 7/06, 7/16, 7/18
U.S. Cl. 252—12                     14 Claims

ABSTRACT OF THE DISCLOSURE

A solid lubricant comprising a partially carbonized, organic matrix material having particulate, solid phase lubricating pigments dispersed throughout. The material is a polymer such as a phenolic resin which, after curing to an infusible, crosslinked (thermoset) state, may be converted to glasslike carbon by pyrolysis at temperatures above that required for curing. The partial carbonization is effected by controlled heating of the cured polymer under conditions causing significant but incomplete conversion.

---

This invention relates to improvements in organic bonded solid lubricants and, in particular, to the enhancement of the structural and operating temperatures characteristics of solid lubricant films and composites employing polymeric matrix materials.

In solid lubricant applications, the use of organic binders or matrices is oftentimes preferred due to the superior wear life characteristics of these materials, particularly at lower operating temperatures generally under 400° F. However, for high temperature applications, inorganic bonded lubricants may be preferred due to their ability to resist the otherwise excessive thermal degradation that would be experienced with an organic bonded lubricant. Ideally, an all purpose lubricant of this type would have the advantageous qualities of both forms of matrices, thereby providing a solid lubricant suitable for a wide variety of applications involving operating temperatures that may be considerably different.

In addition to temperature considerations, the design and fabrication of solid lubricant composites presents the problem of providing the bearing part with the necessary structural strength. In the preparation of self-lubricating composites, workers in the art have been concerned with incorporating glass, carbon, and resin fabrics within resin or metal matrices, but several problem areas have been encountered with each type of matrix. In the case of resin matrices, these tend to exhibit relatively high friction coefficients, low thermal conductivity and inconsistent results. Furthermore, resins which are relatively inexpensive oftentimes exhibit low thermal stability. Conversely, those which do exhibit high thermal stability are generally relatively expensive. Metal matrices, on the other hand, can be designed with good thermal conductivity, good thermal stability, and moderate friction coefficients. However, with a metal matrix the incorporation of fibers or fabrics for strength and rigidity is difficult because of the nonwetting tendency of molten metals on the fibers.

It is, therefore, an important object of the present invention to provide a solid lubricant that utilizes a matrix material which renders the lubricant usable over a wide range of operating temperatures, and which is also compatible with structural reinforcing materials such as fibers or fabrics.

Another important object of the present invention is to provide a solid lubricant having an organic, polymeric matrix material which, by partial carbonization thereof, undergoes physical changes that enhance both the strength and rigidity of the solid lubricant and its usability at relatively high as well as low temperatures.

Still another important object of this invention is to provide a solid lubricant comprising a partially carbonized, organic polymeric matrix material characterized by the property of conversion to a glasslike carbon upon pyrolysis thereof, wherein such material is subjected to controlled heating to effect sufficient carbonization thereof to enhance its high temperature properties and improve the structural strength and rigidity of the lubricant.

Furthermore, it is an important object of this invention to provide a method of converting an organic polymeric matrix material into a high temperature, hard, durable matrix for self-lubricating films and composites.

In general, the function of the lubricant to be described herein is to provide either a coating which is applied to a bearing surface, or a composite body that is formed to a desired configuration and employed as a bearing or as a component of a bearing assembly. In the case of a solid lubricant film, the principle involved is to interpose the lubricating film between mating bearing surfaces by bonding the film to one or more of the mating surfaces. In the case of composites, these are normally cast or hot pressed to the desired shape (such as spherical or annular) and employed as a self-lubricating element that is self-sustaining and executes the lubricating function without the addition of conventional oils or greases.

In the present invention, a polymeric matrix material is employed in the lubricant and is partially carbonized. The pyrolysis of polymers such as phenolic resins, cellulose, and furfuryl alcohol resin causes conversion of the polymeric material to a glasslike carbon. This is an amorphous carbon having physical properties resembling glass more closely than normal graphite, in that it exhibits a glassy surface appearance and has internal characteristics resembling glass, both in appearance and in such properties as strength, hardness and brittleness. (For a comprehensive presentation of the preparation and properties of glasslike carbons, see *A Review of Glasslike Carbons*, DCIC Report 68–2 (April 1968) of the Defense Ceramic Information Center, Battelle Memorial Institute, Columbus Laboratories, Columbus, Ohio.) We have found that polymers suitable as matrices for solid lubricants are not merely thermally degraded if subjected to carbonization under controlled conditions, but actually retain their ability to serve as a matrix material supporting the particulate lubricating pigments that are admixed with the polymer prior to normal curing. However, the characteristic brittleness associated with complete carbonization renders the lubricant unsuitable in practical applications since, in use, it must naturally withstand constant contact with moving parts.

However, through partial carbonization of the matrix material, many of the advantages of complete carbonization are realized without the brittleness problem. Significant but partial carbonization may be effected at temperatures in the range of from approximately 300° to 1000° C. by gradually increasing the temperature of the lubricant (subsequent to normal curing) into this range and maintaining the lubricant at the selected carbonization temperture for a limited period of time, on the order of three hours. By this treatment, the matrix acquires increased hardness and durability, greater thermal conductivity, and much improved thermal stability as the upper limit of the useful operating range of the lubricant is significantly extended.

Phenolic resins are readily available commercially and are relatively inexpensive, and form a suitable matrix material that may be subjected to the partial carbonization process of the present invention. These resins may be utilized as a binder or matrix for solid lubricant films and composites, but suffer from the usual high temperature problems associated with matrices of the organic type, as previously discussed. Besides phenolic resins, a number of other resins are suitable for use as the matrix material in the solid lubricant of the present invention, such as cellulose and furfuryl alcohol resin. Both of these substances undergo conversion to glasslike carbon upon pyrolysis thereof, as discussed above.

The test results and specific formulations to be set forth hereinafter are directed to films and composites in which either a one-stage or a two-stage phenolic resin is employed as the matrix material. The chemistry of resins of this type is well known and, therefore, will only be discussed briefly in this specification. Phenolic resins result from the reaction of phenols with aldehydes, the dominant phenol used in the reaction being $C_6H_5OH$. However, resorcinol (1,3-benzenediol) and alkyl-substituted phenols such as cresols, xylenols, and p-tert-butylphenol and p-phenylphenol are also used. Formaldehyde is the most widely used of the aldehydes although acetaldehyde and furfuraldehyde are sometimes employed.

Phenolic resins may be one stage, heat hardenable or thermosetting, or may comprise two-stage resins generally referred to under the generic term novolac. The novolac resin requires the separate addition of a curing agent, usually hexamethylenetetramine.

Most commercial, one-stage phenolic resins are produced using an alkaline-catalyzed mixture of phenol and formaldehyde, such mixture containing more than one mole of formaldehyde per mole of phenol. The one-stage resin is commonly supplied in liquid form in an alcohol solution, and heat is added to advance the polymerization until the final infusible, insoluble, crosslinked state is reached.

Phenolic resins of the novolac type are prepared from a mixture of less than one mole of formaldehyde per mole of phenol, which when catalyzed with a suitable acid forms a thermoplastic resin that is permanently soluble and fusible (so long as that ratio remains). Novolac resins are commonly supplied in powder form, and are soluble in alcohol prior to curing. The cure (second stage) is effected by the subsequent application of heat and the addition of a crosslinking agent such as hexamethylenetetramine which promotes the formation of the infusible, insoluble, crosslinked final product. In both the one and two-stage resins, the final, thermoset product has essentially the same chemical structure. (If an alkaline catalyst is instead added to the formaldehyde deficient mixture, the product becomes a one-stage resin in phenol; upon heating without the loss of phenol this can be converted to a novolac.) Further information regarding phenolic resins is set forth in *Encyclopedia of Chemical Technology*, Kirk-Othmer, 2nd Edition, Vol. 15, Wiley, New York (1968) pp. 176–194.

Table I sets forth a summary of Falex wear-life data for several solid lubricant films prepared in accordance with the teachings of the present invention. Using a one-stage phenolic resin, a slurry of the resin in an alcohol solution was prepared containing finely divided (200 mesh powder) $MoS_2$ and graphite as the lubricating pigments. The ratio by weight of $MoS_2$ to graphite is 9:1, and the ratio by weight of the combined pigments to the resin is approximately 4:1. The slurry was sprayed onto six sets of Falex pins and V-blocks composed of tool steel, and onto two sets of standard Falex pins and V-blocks. After curing, standard Falex wear-life tests were conducted on these specimens, as set forth in Table I. Two of the eight sets were used as control samples, and the other six sets were modified by partial carbonization. The exact heat treatment for such carbonization is specifically set forth in footnotes to Table I.

TABLE I

Summary of Falex wear-life data for films of $MoS_2$ plus graphite bonded with phenolic resin on tool steel substrates

| Wear-life (min.) | Initial torque (in.-lb.) | Heat treatment[a] | Film thickness (in.) | | |
|---|---|---|---|---|---|
| | | | Pin | V-blocks | |
| 29[b] | 8.0 | A | 0.00040 | 0.00045 | 0.00030 |
| 44[b] | 7.0 | B | 0.00035 | 0.00040 | 0.00055 |
| 36 | 5.5 | A | 0.00050 | 0.00040 | 0.00035 |
| 37 | 6.0 | B | 0.00040 | 0.00040 | 0.00060 |
| 21 | 6.0 | C | 0.00045 | 0.00070 | 0.00045 |
| 47 | 4.5 | D | 0.00035 | 0.00070 | 0.00045 |
| 19 | 4.5 | D | 0.00040 | 0.00020 | 0.00060 |
| 26 | 5.0 | E | 0.00055 | 0.00070 | 0.00050 |

[a] Heat treatments (in $N_2$) in addition to regular cure (1 hour at 300° F.):
A = None.
B = 3° C./min. to 350° C.; held 3 hrs. at 350° C.
C = 3° C./min. to 350° C.; held 3 hrs. at 350° C.; 3° C./min. to 550° C.
D = 3° C./min. to 350° C.; held 3 hrs at 350° C.; 3° C./min. to 750° C.
E = 3° C./min. to 350° C.; held 3 hrs. at 350° C.; 3° C./min. to 900° C.
[b] Standard Falex pins (AISI 3135) and V-blocks (AISI 1137) were used in these tests.
Test conditions.—Falex test rig; air environment; 290 r.p.m. (19 f.p.m.); 1,000 lb. jaw load; room temp, no heat added.

It may be appreciated that the film did not undergo thermal degradation in spite of the high temperatures at which pyrolysis of the cured resin was effected. The wear lives of the eight specimens are all quite comparable even at partial carbonization up to 900° C. Also of particular interest is the relatively low initial torque value (4.5 in.-lb.) for the samples of preparation D versus the value (5.5 in.-lb.) for control sample A on the tool steel substrate. Accordingly, the results clearly indicate that the partially carbonized resin functions effectively as a bonding agent for solid lubricant films on metal surfaces, and is frictionally compatible in a solid lubricant film.

The Falex tester utilized to obtain the data set forth in Table I employed two V-block jaws loaded against a rotating pin having a diameter of one-quarter inch. Both the pin and the V-blocks were coated with the solid lubricant film to present coated bearing components. The standard pin material is an AISI 3135 Steel $R_b$ 87–90 and the V-block material is AISI 1137 Steel $R_c$ 20–24. All wear-life tests were run at a sped of 290 r.p.m. with a 1,000 lb. jaw load. The testing environment was air at the prevailing pressure and ambient temperature (70°–85° F.).

Table II sets forth the results of comparative friction and wear tests on composites made from $MoS_2$ in finely divided form plus the one-stage phenolic resin, showing the benefits of partial carbonization. The ratio by weight of $MoS_2$ to the resin is 1.875:1. For these tests an oscillatory slider friction and wear machine was used consisting of a wear block which is loaded against a flat oscillating

TABLE II

Friction and wear of $MoS_2$ plus phenolic composites

| Phenolic treatment | Running time (min.) | Load (lbs.) | Speed (f.p.m.) | Travel (ft.) | Wear (in.) | Wear (in.³/hr.) ×10⁻⁵ | Wear K (in./ft.) ×10⁻⁸ | Friction coefficient |
|---|---|---|---|---|---|---|---|---|
| Regular cure (heated to 300° F.) | 1,432 | 750 | 12 | 17,184 | 0.0005 | 1.05 | 2.9 | 0.16 |
| | 1,421 | 750 | 24 | 34,104 | 0.0010 | 2.11 | 2.9 | 0.13 |
| | | 750 | 36 | (a) | (a) | | | |
| Regular cure and carbonize at 390° C | 4,308 | 750 | 12 | 51,696 | 0.0023 | 1.60 | 4.5 | 0.13 |
| | 1,432 | 750 | 24 | 34,368 | 0.0007 | 1.47 | 2.0 | 0.12 |
| | 1,425 | 750 | 36 | 51,300 | 0.0006 | 1.26 | 1.2 | 0.10 |
| | 1,409 | 1,500 | 12 | 16,908 | 0.0005 | 1.06 | 3.0 | 0.11 |
| | 1,378 | 1,500 | 24 | 33,072 | 0.0007 | 1.52 | 2.1 | 0.08 |
| | 510 | 1,500 | 36 | 18,360 | 0.0004 | 2.35 | 2.2 | 0.08 |

(a) Specimen failed.
Test conditions.—Test device = Oscillatory slider; Speed = 18 cycles/min. (average speed of 12 f.p.m.); Plate material = AISI 4340 (6–8 µin. RMS); Stroke = ±4 in.; Rider specimen area = 0.5 in.²; Environment = Air at room temperature.

plate. The composite material is glued to the face of the wear block and is held against the opposing face of the oscillating wear plate. The wear block is restrained by a linkage equipped with a strain gauge which is used to measure the frictional force between the block and the plate. The wear block is loaded against the plate by a dead weight and lever system.

The test speciments comprised pieces of the $MoS_2$ plus phenolic material approximately ½ in. x 1 in. x 1/32 in. thick. Each piece was bonded to the ½ in. x 1 in. face of the steel wear block used in the test machine. The specimens were then run at loads of 750 and 1,500 pounds (1,500 and 3,000 p.s.i. respectively assuming full contact of the specimens) with average sliding speeds of 12, 24 and 36 feet per minute. The wear factor (K) set forth in Table II is derived by dividing the wear by the feet of travel.

It may be noted that the $MoS_2$ plus phenolic composite, in which the phenolic had not been carbonized, failed during the 750 pound and 36 f.p.m. part of the test sequence. The specimen failed by cracking along its face. In contrast, the carbonized specimens ran for the complete test sequence and, at the 750 pound load, the wear factors decreased with an increase in test severity (speed). At the 1,500 pound load, the wear factor decreased from $3.0 \times 10^{-8}$ at 12 f.p.m. to $2.1 \times 10^{-8}$ at 12 f.p.m. to $2.1 \times 10^{-8}$ at 24 f.p.m. and remained nearly constant as the speed increased from 24 to 36 f.p.m.

The specimens of Table II were prepared by casting the resin and additives in aluminum weight pans and slowly (over a period of approximately twelve hours) heating them from room temperature to 300° F. until the cure was complete. Then, in order to partially carbonize the cured phenolic resin, the samples were placed in a large graphite crucible with a lid and set in a furnace. An argon atmosphere was provided and the samples were heated from room temperature at approximately 1.5° C./min. (average) to 390° C. and then held at that temperature for three hours.

In addition to the data set forth in Table II, a number of the specimens were sectioned and analyzed to ascertain their physical properties. In general, the specimen interior was void free, and in all instances the material was found to be hard, slick and quite dense. Some specimens had occasional voids due to the bubbles in the solvent produced during casting. For this reason, particularly with thicker composites, use of a two-stage phenolic resin (to be discussed hereinafter) in powdered form (prior to curing) is preferred since this form of the resin lends itself to hot pressing without the need to form a slurry in an alcohol solvent.

In Table III, friction and wear results for one-stage phenolic composites are set forth showing comparative data for the $CPR/MoS_2$ composite and composites utilizing additives other than $MoS_2$ alone. (The abbreviation "CPR" will be used hereinafter for brevity, and refers to partially carbonized phenolic resin of either the one or two-stage type depending upon the particular formulation or test results with which the term is associated.) These tests were conducted utilizing a three pellet test device having a specimen configuration which consists of three pellets sliding over the upper surface of a stationary, horizontal wear plate. The three pellets are embedded in an annular pellet holder disposed above the wear plate, the holder being driven by a vertical drive shaft that extends through the plate. Heads are formed on the bottoms of the pellets, and it is to the faces of these heads that thin pieces of the test material are cemented. Weights are stacked on the holder to load the specimens against the underlying surface of the wear plate. A variable speed DC motor is employed to rotate the drive shaft, and is dynamometer-mounted and its rotation restrained by leaf springs. The spring deflection, which is measured by means of a linear transducer, is an indication of the reaction torque. Friction coefficients are calculated from the reaction torque and the pellet loading.

TABLE III
Friction and wear test results for filled CPR composites

| Composition | Running time (hr.) | Friction coefficient | Average total wear (mils) |
|---|---|---|---|
| $CPR/MoS_2$ | 2 | 0.24 | 0.5 |
|  | 25 | 0.24 | 4.0 |
|  | 50 | 0.22 | 6.7 |
|  | 75 | 0.45 | 10.6 |
| $CPR/MoS_2$ plus graphite | 2 | 0.20 | 0.1 |
|  | 25 | 0.15 | 2.2 |
|  | 50 | 0.12 | 3.4 |
|  | 75 | 0.13 | 5.6 |
|  | 100 | 0.15 | 7.6 |
| CPR/graphite | 2 | 0.23 | 0.0 |
|  | 25 | 0.22 | 0.5 |
|  | 50 | 0.23 | 0.7 |
|  | 75 | 0.25 | 0.8 |
|  | 100 | 0.23 | 0.9 |
| CPR/graphite plus BCM | 2 | 0.20 | 0.0 |
|  | 25 | 0.20 | 0.0 |
|  | 50 | 0.22 | 0.0 |
|  | 75 | 0.25 | 0.1 |
|  | 100 | 0.24 | 0.1 |
| CPR/BCM | 2 | 0.31 | 0.1 |
|  | 25 | 0.36 | 0.3 |
|  | 50 | 0.46 | 0.4 |

NOTE.—Specimens carbonized for 3 hrs. at 395° C.
Test conditions.—Tester=Three-pellet apparatus; Load=13.6 p.s.i.; Speed=765 f.p.m.; Environment=Air; Temperature=Room temp; no heat added.

Carbonization of the specimens was effected the same as with the specimens discussed in relation to Table II, with the final temperature being 395° C. and the specimens being held at such temperature for three hours. The "BCM" additive referred to in Table III is an eutectic mixture of barium fluoride, calcium fluoride and magnesium fluoride. It may be appreciated from the results in Table III that the CPR matrix of the present invention is compatible with a number of different lubricant additives or pigments.

The specific composite compositions in Table III are as follows, expressed in ratios by weight:

$CPR/MoS_2$ —————— 1.875 g. $MoS_2$/g. resin.
$CPR/MoS_2$ + Graphite ——— 1.70 g. additives/g. resin (additives 10 parts $MoS_2$ and 1 part graphite).
CPR/Graphite —————— 0.88 g. graphite/g. resin.
CPR/Graphite + BCM ——— 1.20 g. additives/g. resin. (additives 3 parts graphite and 4 parts BCM).
CPR/BCM —————— 1.67 g. BCM/g. resin.

The flexural strength and elastic modulus for CPR samples (one-stage phenolic resin) filled with either $MoS_2$ or BCM are tabulated below. The flexural strength of pieces of the materials approximately ¼ in. wide by 0.02 in. thick by 0.5 in. long was determined when the material was stressed in a cantilever beam arrangement. The fixture used in these tests allowed for the measurement of the breaking strength and the deflection. The flexural strength and elastic modulus were then calculated using the following formulas:

$$S = \frac{Wl}{1/6\, bd^2}$$

$$E = \frac{Wl^3}{1/4\, ybd^3}$$

Where

S=flexural strength (p.s.i.)
E=elastic modulus (p.s.i.)
W=load (lb.)
l=beam length (in.)
b=beam width (in.)
d=beam thickness (in.)
y=deflection (in.)

The results of these tests are shown in the following tabulation. Two tests were run with the MoS₂ samples.

| Composition | Flexural strength (p.s.i.) | Elastic modulus (p.s.i.) |
|---|---|---|
| CPR/MoS$_2$ | 5,200 | 4.1×10$^5$ |
| CPR/MoS$_2$ | 5,190 | 6.9×10$^5$ |
| CPR/BCM | 2,560 | 6.2×10$^5$ |

A comparison of two-stage and one-stage phenolic resin matrices is presented in Table IV. The three pellet tester was employed with thin pieces of the test material being bonded to the heads of the steel pellets as in the previous test discussed above. The CPR material was then milled flat before the initiation of each test. The two-stage phenolic used in the preparation of the specimens was novolac plus hexamethylenetetramine (hereinafter for brevity referred to as "hexamine") in an alcohol solution of the resin. The amount by weight of hexamine in the solution was 12.5 percent of the weight of the resin. Curing was effected at 300° F., with carbonization as before by gradual heating at an average rate of 1.5° C./min., although the final temperature in this instance was 320° C. The specific composite compositions are the same as corresponding compositions set forth in Table III. The results of these tests clearly show that composites made with the two-stage resin perform in a manner similar to those made with the one-stage resin.

After removal from the die, the cured composites were carbonized in an oven in an argon atmosphere in a manner similar to that as described above for the cast composites, except that a somewhat smaller heating rate is preferred (on the order of 1° C./min. or less). Then pieces of test material were sliced from the composites and bonded to the face of the wear block (rider) used in the oscillatory slider. As is evident from the test results, all of the compositions gave excellent performance data with the approximately 4:1 ratio of MoS₂ to resin (Table VI) providing the best performance; accordingly, this ratio is a preferred formulation for CPR/MoS₂ composites. Furthermore, it may be seen that the hot-pressed composites compare favorably with the previous results for cast composites.

TABLE V
Friction and wear of hot pressed MoS$_2$ plus CPR composite

| Running time (min.) | Load (lbs.) | Speed (f.p.m.) | Travel (ft.) | Wear (in.) | Wear K (in./ft.) ×10$^{-8}$ | Friction coefficient |
|---|---|---|---|---|---|---|
| 1,440 | 750 | 12 | 17,280 | 0.0010 | 5.8 | 0.14 |
| 1,500 | 750 | 24 | 36,000 | 0.0010 | 2.8 | 0.11 |
| 1,440 | 750 | 36 | 51,840 | 0.0007 | 1.4 | 0.09 |

Note.—Composite composition=1.875 g. MoS$_2$/g. resin; Resin=Novolac plus 10% hexamine; Specimens carbonized for 3 hrs. at 400° C.
Test conditions.—Test device=Oscillatory Slider; Plate material= AISI 4340 (6-8 μin. RMS); Stroke=4 in.; Rider specimen area=0.5 in.; Environment=Air at room temperature.

TABLE IV
Three-pellet friction and wear test results for filled cast CPR composites

| | | Two-stage resin [a] | | One-stage resin [b] | |
|---|---|---|---|---|---|
| Composition | Running time (hr.) | Friction coefficient | Average total wear (mils) | Friction coefficient | Average total wear (mils) |
| CPR/MoS$_2$ plus graphite | 2 | 0.30 | 0.0 | 0.20 | 0.1 |
| | 25 | 0.26 | 0.5 | 0.15 | 2.2 |
| | 50 | 0.26 | 0.7 | 0.12 | 3.4 |
| | 75 | 0.28 | 0.8 | 0.13 | 5.6 |
| | 100 | 0.29 | 0.8 | 0.15 | 7.6 |
| CPR/MoS$_2$ | 2 | 0.20 | 0.9 | 0.24 | 0.5 |
| | 25 | 0.16 | 4.1 | 0.24 | 4.0 |
| | 50 | 0.16 | 6.4 | 0.22 | 6.7 |
| | 75 | 0.18 | 9.6 | 0.45 | 10.6 |
| | 100 | 0.18 | 11.7 | | |
| CPR/graphite | 2 | 0.28 | 0.2 | 0.23 | 0.0 |
| | 25 | 0.25 | 0.4 | 0.22 | 0.5 |
| | 50 | 0.20 | 0.5 | 0.23 | 0.7 |
| | 75 | 0.23 | 0.6 | 0.25 | 0.8 |
| | 100 | 0.22 | 0.7 | 0.23 | 0.9 |

[a] Novolac plus 12.5% hexamine, carbonized for 3 hrs. at 320° C.
[b] Carbonized for 3 hrs. at 395° C.
Test conditions.—Tester=Three-pellet apparatus; Load=13.6 p.s.i.; Speed=765 f.p.m.; Environment=Air; Temperature=Room temp., no heat added.

In Tables V, VI and VII, the results of friction and wear tests of hot-pressed CPR/MoS₂ composites are set forth to illustrate the characteristics of these composites as compared with the cast composites previously discussed, and to show the effect of variation of the composite composition (ratio of MoS₂ to resin). The two-stage novolac resin was employed plus the hexamine crosslinking agent in the quantity indicated. In these tests, however, the resin was not dissolved in alcohol; instead, the powdered constituents (including the MoS₂) were mixed mechanically by ball milling. A 1¼ inch diameter steel die was then charged with the admixture and pressure and heat were applied. In practice, the die would, of course, impart the desired configuration to the bearing component to be formed. Hot pressing for the test samples was effected at a temperature of 400° F. under a pressure of 5800 p.s.i. for one hour to achieve a high degree of polymerization.

TABLE VI
Friction and wear of hot pressed MoS$_2$ plus CPR composite

| Running time (min.) | Load (lbs.) | Speed (f.p.m.) | Travel (ft.) | Wear (in.) | Wear K (in./ft.) ×10$^{-8}$ | Friction coefficient |
|---|---|---|---|---|---|---|
| 1,440 | 750 | 12 | 17,280 | 0.0005 | 2.9 | 0.15 |
| 1,440 | 750 | 24 | 34,560 | 0.0009 | 2.6 | 0.12 |
| 1,440 | 750 | 36 | 51,840 | 0.0007 | 1.4 | 0.10 |
| 1,440 | 1,500 | 12 | 17,280 | 0.0007 | 4.1 | 0.12 |
| 1,440 | 1,500 | 24 | 34,560 | 0.0006 | 1.7 | 0.08 |

Note.—Composite composition=3.75 g. MoS$_2$/g. resin; Resin=Novolac plus 12.5% hexamine; Specimens carbonized for 3 hrs. at 400° C.
Test conditions.—Test device=Oscillatory slider; Plate material= AISI 4340 (6-8 μin. RMS); Stroke=4 in.; Rider specimen area=0.5 in.; Environment=Air at room temperature.

TABLE VII

Friction and wear of hot pressed MoS₂ plus CPR composite

| Running time (min.) | Load (lbs.) | Speed (f.p.m.) | Travel (ft.) | Wear (in.) | Wear K (in./ft.) ×10⁻⁸ | Friction coefficient |
|---|---|---|---|---|---|---|
| 1,440 | 750 | 12 | 17,280 | 0.0010 | 5.8 | 0.16 |
| 1,440 | 750 | 24 | 34,560 | 0.0009 | 2.6 | 0.14 |
| 1,440 | 750 | 36 | 51,840 | 0.0013 | 2.5 | 0.10 |
| 1,440 | 1,500 | 12 | 17,280 | 0.0004 | 2.3 | 0.12 |
| 1,440 | 1,500 | 24 | 34,560 | 0.0009 | 2.6 | 0.09 |

Note.—Composite composition=7.488 g.[MoS₂/g. resin; Resin=Novolac plus 10% hexamine; Specimens carbonized for 3 hrs. at 400° C.
Test conditions.—Test device=Oscillatory slider; Plate material= AISI 4340 (6–9 μin. RMS); Stroke=4 in.; Rider specimen area=0.5 in.²; Environment=Air at room temperature.

TABLE VIII

Friction and wear of MoS₂ plus CPR composite reinforced with graphite fibers

| Running time (min.) | Load (lbs.) | Speed (f.p.m.) | Travel (ft.) | Wear (in.) | Wear K (in./ft.) ×10⁻⁸ | Friction coefficient |
|---|---|---|---|---|---|---|
| 1,440 | 750 | 12 | 17,280 | 0.0006 | 3.5 | 0.12 |
| 1,440 | 750 | 24 | 34,560 | 0.0007 | 2.0 | 0.11 |
| 1,440 | 750 | 36 | 51,840 | 0.0007 | 1.4 | 0.09 |
| 1,440 | 1,500 | 12 | 17,280 | 0.0008 | 4.6 | 0.07 |
| 1,440 | 1,500 | 24 | 34,560 | 0.0007 | 2.0 | 0.08 |
| 1,440 | 1,500 | 36 | 51,840 | 0.0011 | 2.1 | 0.08 |

Note.—Composite composition=3.75 g. MoS₂/g. resin plus 0.1g. graphite fibers/g. MoS₂; Resin=Novolac plus 10% hexamine; Specimens carbonized for 3 hrs. at 400° C.
Test conditions.—Test device=Oscillatory slider; Plate material= AISI 4340 (6–9 μin. RMS); Stroke=4 in.; Rider specimen area=0.5 in.²; Environment=Air at room temperature.

TABLE IX

Friction and wear of MoS₂ plus Sb₂O₃ plus CPR composite

| Running time (min.) | Load (lbs.) | Speed (f.p.m.) | Travel (ft.) | Wear (in.) | Wear K (in./ft.) ×10⁻⁸ | Friction coefficient |
|---|---|---|---|---|---|---|
| 1,440 | 750 | 12 | 17,280 | 0.0007 | 4.1 | 0.14 |
| 1,440 | 750 | 24 | 34,560 | 0.0006 | 1.7 | 0.09 |
| 1,440 | 750 | 36 | 51,840 | 0.0008 | 1.5 | 0.06 |
| 1,440 | 1,500 | 12 | 17,280 | 0.0006 | 3.5 | 0.08 |
| 1,440 | 1,500 | 24 | 34,560 | 0.0003 | 0.9 | 0.05 |
| 1,440 | 1,500 | 36 | 51,840 | 0.0014 | 2.7 | 0.04 |

Note.—Composite composition=1.875 g. MoS₂/g. resin plus 0.45 g Sb₂O₃/0.55 g. MoS₂; Resin=Novolac plus 10% hexamine; Specimens carbonized for 3 hrs. at 400° C.
Test conditions.—Test device=Oscillatory slider; Plate material = AISI 4340 (6–8 μin. RMS); Stroke=4 in.; Rider specimen area=0.5 in.²; Environment=Air at room temperature.

TABLE X

Friction and wear of MoS₂ plus Sb₂O₃ plus CPR composite reinforced with graphite fibers

| Running time (min.) | Load (lbs.) | Speed (f.p.m.) | Travel (ft.) | Wear (in.) | Wear K (in./ft.) ×10⁻⁸ | Friction coefficient |
|---|---|---|---|---|---|---|
| 1,440 | 750 | 12 | 17,280 | 0.0004 | 2.3 | 0.14 |
| 1,440 | 750 | 24 | 34,560 | 0.0005 | 1.5 | 0.10 |
| 1,440 | 750 | 36 | 51,840 | 0.0007 | 1.4 | 0.07 |
| 1,440 | 1,500 | 12 | 17,280 | 0.0003 | 1.7 | 0.08 |
| 1,440 | 1,500 | 24 | 34,560 | 0.0007 | 2.0 | 0.06 |
| 1,440 | 1,500 | 36 | 51,840 | 0.0010 | 1.9 | 0.04 |

Note.—Composite composition=1.875 g. MoS₂/g. resin plus 0.45 g. Sb₂O₃/0.55 g. MoS₂ plus 0.1 g. graphite fiber/g. MoS₂; Resin=Novolac plus 10% hexamine; Specimens carbonized for 3 hrs. at 400° C.
Test conditions.—Test device=Oscillatory slider; Plate material= AISI 4340 (6–8 μin. RMS); Stroke=4 in.; Rider specimen area=0.5 in.²; Environment=Air at room temperature.

TABLE XI

High load friction and wear of MoS₂ plus Sb₂O₃ plus CPR composite reinforced with graphite fibers

| Running time (min.) | Load (lbs.) | Speed (f.p.m.) | Travel (ft.) | Wear (in.) | Wear K (in./ft.) ×10⁻⁸ | Friction coefficient |
|---|---|---|---|---|---|---|
| 1,423 | 1,500 | 12 | 17,076 | 0.0012 | 7.0 | 0.07 |
| 1,403 | 1,500 | 24 | 33,672 | 0.0018 | 5.4 | 0.05 |
| 1,120 | 1,500 | 36 | 40,320 | (a) | | 0.04 | a Composite broke up during this test sequence.
Note.—Composite composition=1.875 g. MoS₂/g. resin plus 0.45 g. Sb₂O₃/0.55 g. MoS₂ plus 0.1 g. graphite fiber/g. MoS₂; Resin=Novolac plus 10% hexamine. Specimens carbonized for 3 hrs. at 400° C.
Test conditions.—Test device=Oscillatory slider; Plate material= AISI 4340 (6–8 μin. RMS); Stroke=4 in.; Rider specimen area=0.125 in.²; Environment=Air at room temperature.

The test results set forth in Tables VIII, IX, X and XI illustrate the characteristics of the solid lubricant composite of the present invention with graphite fibers and antimony trioxide (Sb₂O₃) as additives. The increase in the strength of the composite due to the addition of the graphite fibers may be seen by noting the 1500 lb. test sequences in Tables VIII, X and XI, particularly at 36 f.p.m. (In Table XI, the pressure was quadrupled to 12,000 p.s.i. by the reduction in the rider specimen area to 0.125 in.².) In the test results set forth in Table VI for the composite (comparable to the composite of Table VIII) without graphite fibers, no data is set forth for this 36 f.p.m. test sequence since an attempt was made to run the unreinforced composite and breakage occurred.

Furthermore, this test data demonstrates the compatibility of the partially carbonized matrix of the present invention with graphite fiber reinforcement. Additionally, comparing the data in Tables IX and X, it is seen that the total wear, after the complete test sequence, of the composite containing the graphite fibers was 0.0036 in. while the total wear of the composite which did not contain the graphite fibers was 0.0044 in.

In summary, the advantages and features of the present invention through the employment of partial carbonization include the following:

1. Hardness and strength is increased over the uncarbonized resin bonded films and composites, permitting use of the solid lubricants at higher loads—especially in the case of composites.

2. Thermal conductivity is increased over the uncarbonated resin matrices in order to allow the lubricant to be used at higher ambient temperatures since the heat generated at the friction surface is dissipated more rapidly.

3. The wear lives of the films and composites are increased through reduced wear rates.

4. The useful temperature range is materially increased since the carbonized resin matrix retains its strength and hardness to higher temperatures than the uncarbonized resin.

5. A wide variety of additives may be incorporated into into the film or composites as with regular resin bonded formulations, both fibrous materials for strengthening purposes and particulate materials for lubrication enhancement. This is a definite advantage over metal or ceramic bonded films and composites wherein the effective additive choice is limited by the poor bonding of some classes of materials on others as, for instance, metals on ceramic or glass fibers.

6. The carbonizing heat treatment may be optimized in terms of friction and wear performance for specific applications. The higher the temperature at which the matrix is carbonized, the greater the thermal stability of the finished lubricant. Thus, for high temperatures and high loads, a higher heat treatment may be employed for optimum friction and wear performance as compared with lower temperature or lower load applications.

Having thus described the invention, what is claimed as new and desired to be secured by Letters Patent is:

1. A solid lubricant composition comprising a non-brittle, partially carbonized organic polymer which has been cured and pyrolyzed to a glasslike carbon, and particulate, solid phase lubricating pigments dispersed throughout, the weight ratio of the lubricating pigments to the non-brittle, partially carbonized polymer being such as to provide said composition with a relatively low friction coefficient and long wear life, said non-brittle, partially carbonized polymer having been formed by curing said polymer admixed with said lubricating pigments to an infusible, cross-linked state, and then pyrolyzing the cured admixture by heating the same to temperatures above the curing temperature in the range of from approximately 300° C. to 1000° C. for a period of at least about three hours and sufficient to cause partial carbonization of the polymer and conversion to a glasslike carbon.

2. The composition of claim 1 which is in the form of a lubricating film adhered to a base to present a bearing.

3. The composition of claim 1 which is in the form of a composite.

4. The composition of claim 1 wherein the polymer is a phenolic resin.

5. The composition of claim 1 wherein the pyrolysis is at approximately 400° C.

6. The carbonizing heat treatment may be optimized pigments include $MoS_2$.

7. The composition of claim 1 wherein the polymer is a cellulose resin.

8. The composition of claim 1 wherein the polymer is furfuryl alcohol resin.

9. A method of making a solid lubricant composition comprising a non-brittle, partially carbonized organic polymer which has been cured and pyrolyzed to a glasslike carbon, and particulate, solid phase lubricating pigments dispersed throughout, the weight ratio of the lubricating pigments to the non-brittle, partially carbonized polymer being such as to provide said composition with a relatively low friction coefficient and long wear life, said method comprising the steps of:
   mixing the organic polymer and the particulate lubricating pigments,
   curing said organic polymer admixed with said lubricating pigments to an infusible, crosslinked state,
   and then pyrolyzing the cured admixture by heating the same to temperatures above the curing temperature in the range of from approximately 300° C. to 1000° C. for a period of at least about three hours and sufficient to cause partial carbonization of the polymer and conversion to a glasslike carbon.

10. The method of claim 9 wherein the pyrolysis is effected by gradually increasing the temperature of said cured admixture into said range.

11. The method of claim 9 wherein the polymer is a phenolic resin.

12. The method of claim 11 wherein the pyrolysis is at approximately 400° C.

13. The method of claim 9 wherein the polymer is a cellulose resin.

14. The method of claim 9 wherein the polymer is furfuryl alcohol resin.

References Cited

UNITED STATES PATENTS

| | | | |
|---|---|---|---|
| 3,553,394 | 1/1971 | Zidlicky | 252—12 |
| 3,730,893 | 5/1973 | Bilow et al. | 252—12 |
| 3,218,255 | 11/1965 | Pratt | 252—12.4 |
| 3,287,288 | 11/1966 | Reiling | 252—12.4 |
| 3,592,783 | 7/1971 | Edmonds | 252—12.4 |
| 3,678,145 | 7/1972 | Boes | 252—12.4 |

FOREIGN PATENTS

| | | | |
|---|---|---|---|
| 1,202,916 | 10/1970 | Great Britain | 252—12.4 |

DANIEL E. WYMAN, Primary Examiner

I. VAUGHN, Assistant Examiner

UNITED STATES PATENT OFFICE
CERTIFICATE OF CORRECTION

Patent No. 3,847,825      Dated November 12, 1974

Inventor(s) Melvin T. Lavik et al

It is certified that error appears in the above-identified patent and that said Letters Patent are hereby corrected as shown below:

Column 11, lines 10 and 11, claim 6 should read as follows:

6. The composition of claim 1 wherein the lubricating pigments include $MoS_2$.

Signed and sealed this 7th day of January 1975.

(SEAL)
Attest:

McCOY M. GIBSON JR.
Attesting Officer

C. MARSHALL DANN
Commissioner of Patents